United States Patent [19]

Beckman

[11] Patent Number: 4,460,902
[45] Date of Patent: Jul. 17, 1984

[54] VEHICLE DRIVE RECORDER

[76] Inventor: Jesse W. Beckman, 7706 Forest Ave., Munster, Ind. 46321

[21] Appl. No.: 462,893

[22] Filed: Feb. 1, 1983

[51] Int. Cl.³ ............................................. G01D 9/32
[52] U.S. Cl. ........................................ 346/7; 73/510
[58] Field of Search ................................ 73/491–492, 73/514, 510; 346/7; 116/200

[56] References Cited

U.S. PATENT DOCUMENTS

| | | | |
|---|---|---|---|
| 1,634,992 | 7/1927 | Gardner | 346/7 |
| 1,642,114 | 9/1927 | Kirner | 346/7 |
| 1,975,183 | 10/1934 | Supper | 346/7 |
| 2,838,358 | 6/1958 | Wattles, Jr. | 346/7 |
| 2,903,320 | 9/1959 | Changy | 346/7 |
| 3,218,870 | 11/1965 | Baker | 73/514 |
| 3,503,364 | 3/1970 | Dirks | 116/200 |
| 3,720,943 | 3/1973 | Smith | 346/7 |
| 3,790,951 | 2/1974 | O'Neill et al. | 73/514 |
| 4,031,848 | 6/1977 | Killen | 73/514 |

Primary Examiner—J. V. Truhe
Assistant Examiner—A. Evans
Attorney, Agent, or Firm—Gary, Juettner & Pyle

[57] ABSTRACT

A tamper proof, economically constructed, easily installed, drive recorder or instrument for making a permanent record of the manner in which a vehicle is driven is provided, and comprises an instrument which may be located in and secured to the vehicle of a driver whose driving habits are to be recorded. The recorder preferably has two compartments each having inclined bottom surfaces to normally position a heavy ball by gravity. The inclined bottom surfaces are provided with recording paper, and the vehicle's acceleration, braking or cornering causes the heavy balls to move from their normal positions up the inclined surfaces and the heavy balls to leave a track on the recording paper to make a permanent recording of the drive.

16 Claims, 5 Drawing Figures

VEHICLE DRIVE RECORDER

This invention relates to apparatus for measuring and making a permanent record of the manner in which a person operates a vehicle, and in more particular to a drive recorder which makes a permanent tracing of the vehicle's accelerations, brakings and cornerings.

BRIEF SUMMARY OF THE INVENTION

Each year throughout the United States, many thousands of persons are killed in automobile accidents, a high percentage of which are caused by reckless or drunken drivers. This type of driver engages in fast accelerations, fast cornering, and many times, desperate braking, often causing innocent persons to be injured when he shoots out in front of them at an intersection, forces them off a curve, or brakes all too late, and rear ends the innocent party. Many times these reckless and drunken drivers are caught and charged with violations of the law before they seriously injure or kill someone. However, all to many times, the now sober driver appears before the judge, sometimes many days after the incident, and convinces the judge that he needs his car to make a living and to support his family. In such circumstances, the judge knows this to be true, and as there were no serious problems this time, relying on the man's sworn statement he will error no more, the judge permits him to continue to drive, for example for restricted purposes, only to and from work, or only in a proper and safe manner. Unfortunately, the man often times slips into his former ways, and heretofore there has been no practical way to monitor his driving conduct. Society cannot afford to assign a police officer in a patrol car to watch each potential bad driver, even though that practice would probably eliminate bad drivers.

While various complicated mechanical, electrical and electronic devices have been devised for measuring accelerations, for example, see U.S. Pat. No. 3,790,951, and there have been various devices which measure a vehicle's braking, see U.S. Pat. No. 2,838,358, or its impact, See U.S. Pat. No. 1,975,183, none have been used for and/or are successful in monitoring a driver. While there have been vehicle performance monitor devices using the inertia of a ball, see U.S. Pat. No. 3,503,364 and 4,031,848, none provide a sealed or tamper proof record. While another type of vehicle drive record is shown in U.S. Pat. No. 3,218,870, it provided only a temporary record which was easily destroyed or tampered with and uses difficult to adjust and regulate tension members (i.e. rubberbands) to position the ball. The use of tension members and the need to have them react the same and be adjusted the same made such device difficult to operate and unreliable over a period of time.

The vehicle drive recorder of the present invention has overcome the disadvantages of earlier devices and is the best thing that can be done to monitor the conduct of a driver, short of assigning a policeman to watch him constantly. As the driver whose driving is being monitored by the vehicle drive recorder of the present invention knows that his reckless accelerations, brakings, and cornerings are being recorded and will be brought to the judge's attention and result in his driving privilege being suspended, he will not engage in such activities.

The vehicle drive recorder of the present invention is economical to manufacture and can be secured under lock or tamper proof seal in a driver's car to monitor his driving, and comprises a compartment or box with a lockable or sealable opening closed by a lid or the like, which may be secured or positioned in the driver's car. Within the compartment are inclined bottom walls and vertically standing guide walls that support and contain a pair of heavy balls, made of metal, such as large diameter ball bearings. These heavy balls are held in their normal position at the lowest portion of the inclined bottom by gravity. Due to their mass, the heavy balls will move out of their normal or bottom positions up the inclined surfaces when subject to acceleration, braking or cornering forces. To record the movement of the balls, the inclined bottom surfaces are fitted out with recording means in the form of tracing or carbon type paper and an underlying driving record sheet or paper form. Additionally, vertical guides are provided to cause the paths of the heavy balls to fan out as they roll down back to their normal position so that not only are the maximum accelerations, brakings and cornerings recorded, but the number of such instances can also be determined. Thus, as the heavy balls move up the inclined bottom surfaces, their paths are permanently recorded for review of the driver's habits by the appropriate authority, and the driver's privileges suspended if need be, or other more stern measures taken.

It is the primary object of the vehicle driver recorder of the present invention to provide a practical apparatus for recording a vehicle's accelerations, braking and cornering motions.

Another object of the vehicle drive recorder of the present invention is to provide an apparatus which is economical to manufacture, easy to install, totally reliable and tamper proof in operation.

Yet another object of the vehicle drive recorder of the present invention is to provide an apparatus which uses a pair of heavy balls, each to record the vehicle's acceleration or braking and one of its cornering motions.

These and other objects of the vehicle drive recorder of the present invention will become apparent from the following written description and the accompanying figures of the drawings wherein.

DESCRIPTION OF THE PREFERRED EMBODIMENT

Figure 1:
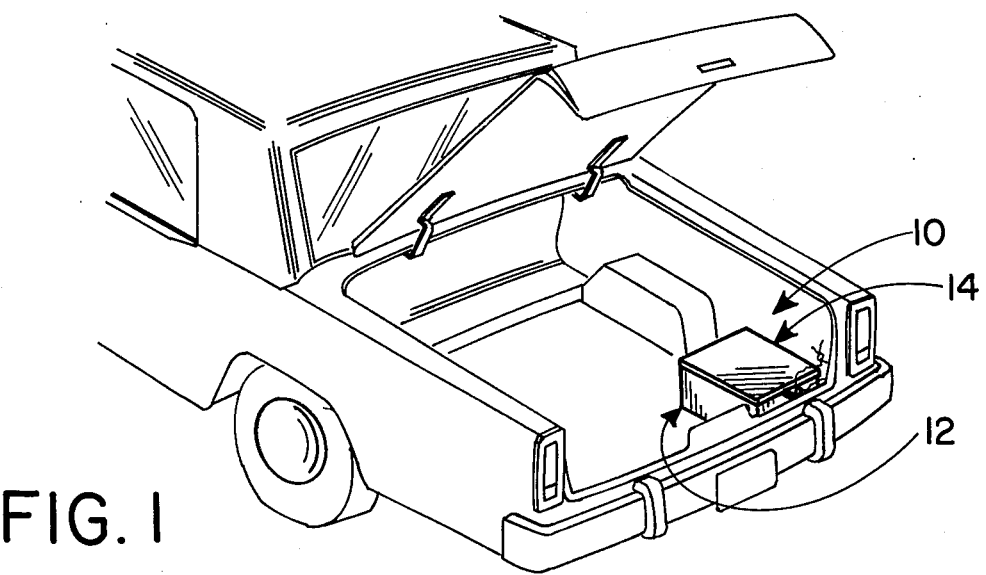
FIG. 1 is a perspective view of the vehicle drive recorder of the present invention shown installed in the trunk of a vehicle.

Referring now to FIG. 1, a vehicle drive recorder or instrument 10 of the present invention is shown installed in the trunk of an automobile. The drive recorder 10 comprises a box or the like, having a container bottom 12 and a lid therefor 14. Any other suitable container having a closable opening could be used, provided it was of sufficient size. In this instance, both the container 12 and lid 14 are fitted with a pair tabs 16 one on each of the container and lid. The tabs 16 in turn have openings 18 therein. The openings 18 in turn may receive a seal 19 for closing the lid and container and in addition for securing the drive recorder 10 to the inside rear of the trunk of the vehicle. In such instances, the seal 19 may be threaded through perforated openings normally found in the rear margins at the lower end of the trunk, to help hold the recorder 10 in place. In many instances, the seal 19 will be sufficient to hold the recorder in place. However, the box 10 may also be wedged into a convenient nook or corner in the vehicle's trunk to help retain it. Should it be necessary, the box or lid can be held by other means such as fasteners secured to the floor of the trunk of the vehicle, or to the rear margin of the vehicle body or the side of the fender. Of course, as is conventional, these fasteners can be made tamper proof or, may be included within the container 12 and lid 14 and thus protected by being within the enclosed box 10.

Figure 2:
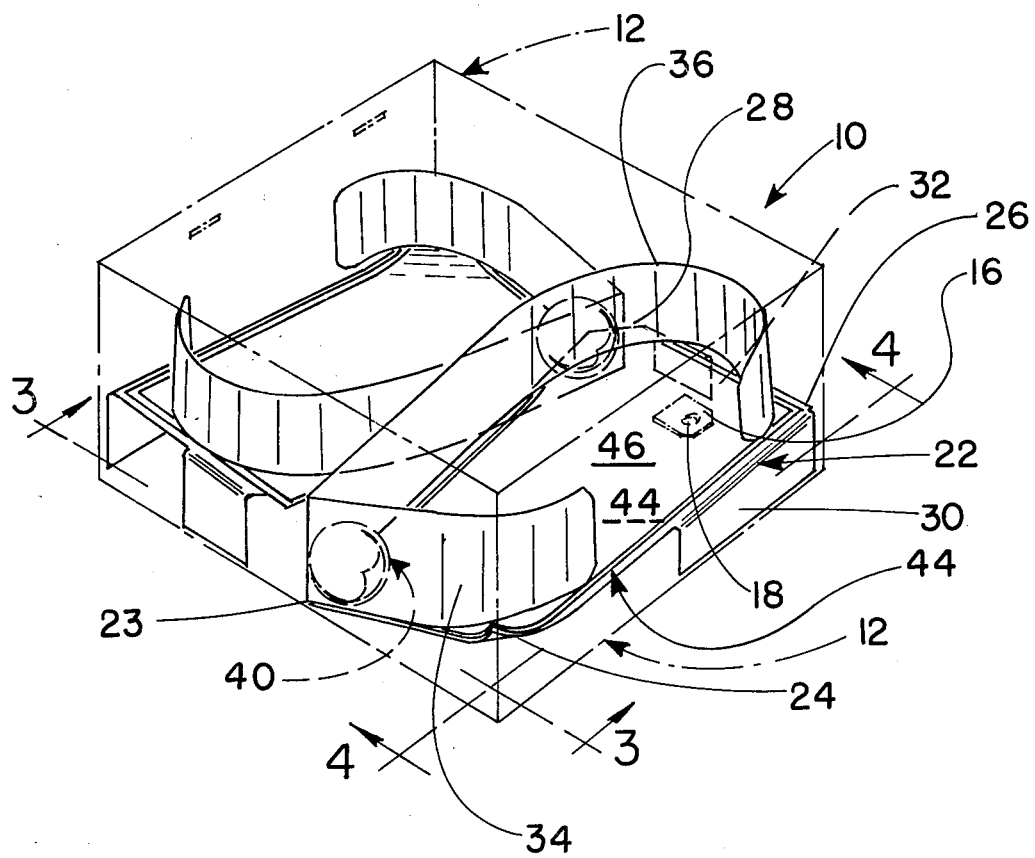
FIG. 2 is an enlarged perspective view of the recorder shown in FIG. 1, with its lockable or sealable lid removed to show its interior.

Referring to FIG. 2, the vehicle recorder 10 has been illustrated with the outer walls of the container 12 shown in phantom lines while the lid 14 has been removed. This has been done to better illustrate the interior of the vehicle recorder 10. As is shown, the box 12 is divided into two portions or compartments, in this instances the front and rear of the box, which are identical to each other but turned 180 degrees. In each of the compartments of the box is provided an inclined bottom surface means 22 which has a low end 23 and raised ends or corners 24, 26 and 28. The low end 23 generally abuts against the bottom of the container 12, while the corners 24, 26 and 28 are held above the bottom of the container by a pair of downwardly extending tabs or legs 30 and 32. As preferably, each of the inclined bottom surfaces 22 is provided by a sheet member, ideally made of sheet metal, the legs 30 and 32 are simply formed by bending them from the plane of the inclined surface 22.

Adjacent the perimeter or margins of each of the inclined bottom surfaces 22, a pair of upstanding, vertical guide walls 34 and 36 are provided. These guide walls extend at right angles away from the lowest point 23 and upwardly. The guide wall 34 extends in a curved manner beyond the corner 24. While the guide wall 36 curves around the corner 28, around the corner 26 and just past that corner. The guide walls likewise are preferably made of sheet metal and fastened by such means as tabs, not shown, which may be rivetted, screwed or otherwise secured to the inclined surface member 22 or the vertical walls of the bottom container 12.

A large diameter heavy ball 40 is provided for each of the compartments of the drive recorder. Preferably, in order to obtain sufficient mass to work accurately and not to be effective by random occurances encountered while driving, the heavy ball is of a large diameter of an inch or more, preferably of about two inches in diameter, and made of steel or a similarly dense material so that it has a high specific density (of 6 or greater) and mass.

Figure 3:
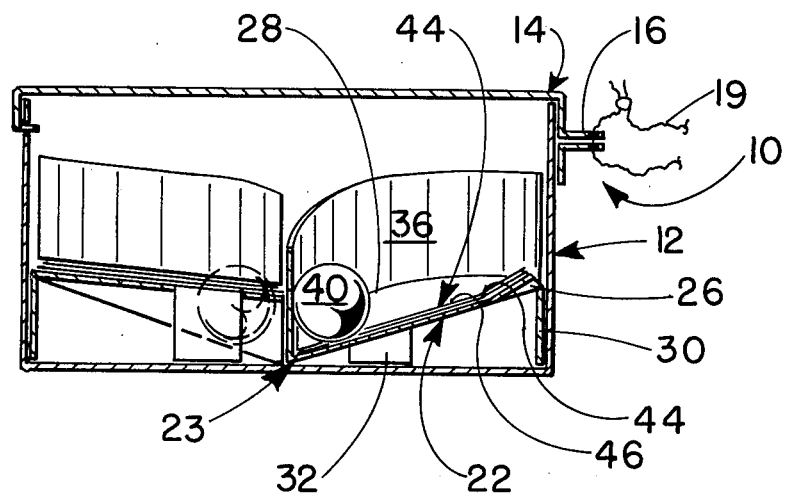
FIG. 3 is a cross-sectional view taken along the lines 3—3 of FIG. 2.
Figure 4:
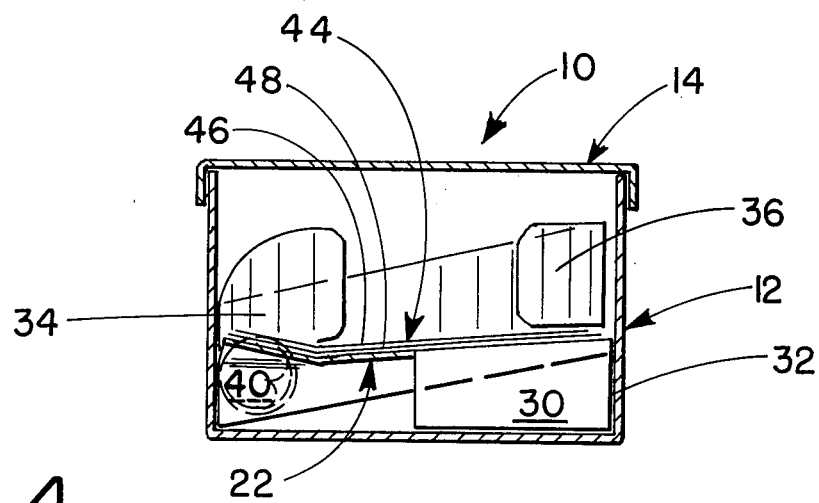
FIG. 4 is a cross-sectional view taken along the lines 4—4 of FIG. 2.

As can be appreciated, as the trunk of the car is substantially level, the bottom of the container 12 will also be substantially level. In such circumstance, the balls 40 will move toward the lowest points 23 on the inclined bottom surfaces 22 and be held there by gravity. However, when the car is subject to acceleration, braking and cornering forces, they will cause the balls to move from the low point 23 up the inclined bottom surfaces 22. As is better seen in FIGS. 3 and 4, to record these motions each compartment of the vehicle drive recorder 10 is fitted with recording means 44, in this instance in the form of tracing paper, such as the carbon paper 46 shown superimposed over the driver recorder paper form 48. Of course, the tracing or carbon paper could be flipped over and the driver form put on top. Thus, as the heavy balls rolls across the carbon paper 46 it causes the carbon paper to make a tracing or track on the driver recorder form 48.

Figure 5:
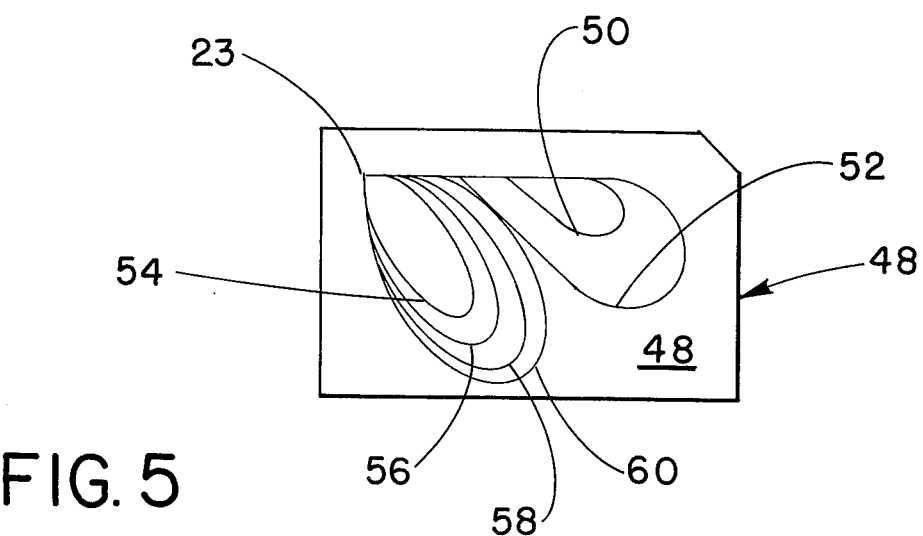
FIG. 5 is a plan view of one of two drive record forms that line the bottom inclined surfaces, showing the many paths of the heavy ball.

Referring to FIGS. 2 and 5, it can be seen that one corner of the driver recorder form 48, and likewise a corner of the carbon paper, is cut-off to form a register with the vertical guide wall. This register helps retains the drive recorder form and carbon paper in place on the inclined surface 22 and helps insure its proper orientation.

As is now believed apparent from the foregoing description and drawings, the rear compartment of the drive recorder 10 as shown in FIG. 2 when mounted as shown in FIG. 1 will record vehicle accelerations, as the ball 40 moves towards corner 24 and rapid cornering of the vehicle to the left as the ball 40 would move toward the corner 28. Likewise, the forward compartment of the driver recorder 10 records rapid braking as the other ball would move forward and rapid cornering as the car turned toward the right (the ball moving toward the left side of the forward compartment).

Referring now to FIG. 5, a schematic of a driver record form from the rear compartment is shown. It will be noted that the hard cornering of the vehicle in a left turn will cause ball track or path 50 to be formed which will indicate the magnitude of the centrifugal force incurred during making such hard turn. As can be seen the second path 52 made during harder cornering is of a greater magnitude than that of path 50. The curved portion of the guide wall 36 between corners 28 and 26 helped or caused a spreading out or fanning out of the return paths 50 and 52 of the heavy ball 40 so that it is possible to count the number of instances that the driver has made hard cornerings to the left. In this instance only two such paths 50 and 52 are shown.

Similarly, the fast accelerations of the driver can be noted as they have left paths 54, 56, 58 and 60. Again, the curved guide wall at the corner 24 causes the returned path of the ball to fan out so as to make it possible to count the number of instances on which hard acceleration occurred.

Of course, the sensitivity of the drive recorder 10 of the present invention can be varied by altering the angle or slope of the inclined bottom surfaces 22. For example, where the performance of a truck is to be measured, the slopes might be made less steep as a truck is generally less capable of acceleration and cornering as is an automobile. Of course, the slopes need not be the same, but can be varied for acceleration and braking, particularly for low powered vehicles. Low powered vehicles are generally not capable of great accelerations but are capable of rapid braking. Thus, in a drive recorder for a low powered vehicle there might be a different pitch or inclination for the braking measuring portion in the front compartment than for the acceleration measuring portion in the rear compartment. Similarly, the inclination for the cornering forces can also be varied from that for the braking or acceleration measurement. Generally, since vehicles are capable of equal cornering forces in each direction, the slopes or inclinations for the measuring the cornering forces in the two directions would be the same.

One of the principle advantages of the drive recorder of the present invention is the ease with which it may be installed in a driver's vehicle and the reliability with which it will measure the driver's actions. All this is done without the need of a complicated electrical or mechanical connections and/or complicated electronic devices requiring connection to various power supplies.

Of course, the driver recorder form can have various printed markings thereon (not shown) which indicate what levels of the acceleration, braking and/or cornering and what is an is acceptable maximum. Thus, the judge or authority can easily determine from the printed matter and the ball tracings on the form, whether the driver has stayed within the permissible limits. Should it be desired, to provide the driver with some form of feedback as to how he is performing, perhaps on an initial test circuit, the lid could be made transparent so that after a short drive to demonstrate how the device works, the driver could see through the lid that he is being "watched". Then, the opaque cover could be installed.

While only the preferred embodiment of vehicle drive recorder of the present invention has been illustrated and described, from the foregoing, it should be understood that variations, modifications and equivalent structures thereof shall fall within the scope of the appended claims.

What is claimed is:

1. A vehicle drive recorder comprising a tamper proof box having a pair of compartments therein, each of said compartments having an inclined bottom surface, and low points on each said two inclined bottom surfaces, each of said compartments having guide wall means, said two low points being at opposite ends, a heavy ball in each of said compartments being biased by gravity toward said low point on each of said inclined bottom surfaces, and recording means in said compartments juxposed between said inclined bottom surfaces and said heavy balls, said box being adapted to be mounted in a vehicle, whereby movement of said heavy balls due to acceleration, braking and cornering forces on said vehicle are measured and recorded by movement of said balls over said recording means.

2. In a vehicle drive recorder as in claim 1, wherein said heavy balls are of one inch or larger in diameter and made of a material of a density approximately equal to or greater than that of steel.

3. In a vehicle drive recorder as in claim 1, wherein said recording means further comprises pressure sensitive paper which will leave a mark thereon when said heavy balls roll across.

4. In a vehicle drive recorder as in claim 3, wherein said recording means further comprises carbon type tracing paper or the like.

5. In a vehicle drive recorder as in claim 1, wherein said box has a height greater than that of the diameter of said heavy balls.

6. In a vehicle drive recorder as in claim 1, wherein said compartments are identical but rotated 180 degrees with respect to each other, each of said compartments having guide means in the form of generally upstanding vertical guide walls extending out at right angles from said low point, said guide walls terminating in curved portions away from said low point.

7. A vehicle drive recorder as in claim 1, wherein each of said inclined bottom surfaces is formed by a plane extending upward from said low point toward the opposite ends of said box.

8. A vehicle drive recorder as in claim 1, wherein said inclined bottom surfaces and guide walls means are formed of sheet material.

9. A vehicle drive recorder as in claim 8, wherein said inclined bottom surfaces and guide walls means are formed of sheet metal.

10. A vehicle drive recorder as in claim 8, wherein each of said inclined bottom surfaces has at least two downwardly extending legs located away from said low point, said legs supporting said inclined bottom surfaces in said box.

11. A vehicle drive recorder as in claim 8, wherein said guide walls means have bent tabs for supporting the same on one of said inclined bottom surface or box.

12. A vehicle driver recorder as in claim 1, further comprising a lid, said lid being one of lockable or sealable to said box, whereby said recorder is rendered tamper proof.

13. A vehicle drive recorder as in claim 1, further comprising a seal and a lid for closing said box, said lid and said box having means for receiving said seal, said seal engaging said lid and said box to seal the same and also being adapted to engage an opening in the vehicle to mount said recorder in said vehicle.

14. A vehicle drive recorder as in claim 1, further comprising means for securing said recorder to a vehicle, said means for securing being located beneath one of said inclined bottom surfaces.

15. A vehicle drive recorder comprising a tamper proof box having a pair of compartments therein, each of said compartments having an inclined surface bottom, and low points on said two inclined bottom surfaces, said inclined bottom surfaces lying in a plane extending upwardly from said low points to the opposite ends of said compartments, said compartments being adjacent each other with said two low points being at the middle of the sides of said box, said two compartments being identical but rotated 180 degrees from each other, said guide walls vertically extending upwardly and outwardly at right angles from said low points, said guide walls terminating in curved portions away from said low points, a heavy ball in each of said compartments being biased by gravity toward said low point on each of said inclined bottom surfaces, said heavy balls being of two inches or larger in diameter and made of a material of a specific density approximately equal to or greater than six, a lid and a seal for closing said box, said lid and said box having means for receiving said seal, said seal engaging said lid and said box to seal the same and also being adapted to engage an opening in the vehicle to mount said recorder in said vehicle, and recording means in each of said compartments juxposed between said inclined bottom surfaces and said heavy balls, said recording means including pressure sensitive means which will leave a mark when said ball rolls across, said box being adapted to be mounted in a vehicle, whereby movement of said heavy balls due to acceleration, braking and cornering forces on the vehicles are measured and recorded by movement of said heavy balls up the inclined bottom surfaces and across said recording means.

16. In a vehicle drive recorder as in claim 15, wherein said recording means further comprises carbon type paper or the like, said box having a height at least one and one-half times that of the diameter of said heavy balls, said inclined bottom surfaces and guide walls being formed of sheet metal, each of said inclined bottom surfaces having at least two downwardly extending legs located away from said low point, said legs supporting said inclined bottom surface in said box, said guide walls having bent tabs for supporting the same on one of said inclined bottom surfaces or box.

* * * * *